US011714612B2

(12) United States Patent
Accardo et al.

(10) Patent No.: US 11,714,612 B2
(45) Date of Patent: Aug. 1, 2023

(54) TECHNIQUES FOR PERSONALIZING GRAPHICAL USER INTERFACES BASED ON USER INTERACTIONS

(71) Applicant: DISNEY ENTERPRISES, INC., Burbank, CA (US)

(72) Inventors: Anthony Accardo, Los Angeles, CA (US); Erika Varis Doggett, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 590 days.

(21) Appl. No.: 16/826,040

(22) Filed: Mar. 20, 2020

(65) Prior Publication Data

US 2021/0294582 A1 Sep. 23, 2021

(51) Int. Cl.
*G06F 8/38* (2018.01)
*G06F 11/36* (2006.01)
(Continued)

(52) U.S. Cl.
CPC .............. *G06F 8/38* (2013.01); *G06F 3/0484* (2013.01); *G06F 11/3438* (2013.01);
(Continued)

(58) Field of Classification Search
None
See application file for complete search history.

(56) References Cited

U.S. PATENT DOCUMENTS 9,378,467 B1  6/2016  Chaiyochlarb et al.
9,448,962 B2  9/2016  Sharon et al.
(Continued)

FOREIGN PATENT DOCUMENTS

CN  108469975 A   8/2018
IN  201741011138 A  10/2018

OTHER PUBLICATIONS

Friedman et al., "Generalizing Across Multi-Objective Reward Functions in Deep Reinforcement Learning", Department of Electrical Engineering Cooper Union, https://arxiv.org/abs/1809.06364, arXiv:1809.06364v1 [cs.LG], Sep. 17, 2018, pp. 1-8.
(Continued)

*Primary Examiner* — Qing Chen
(74) *Attorney, Agent, or Firm* — Artegis Law Group, LLP

(57) ABSTRACT

A graphical user interface ("GUI") personalization application automatically generates a GUI for a software application. In operation, the GUI personalization application tracks interactions between a user and a first GUI that is associated with the software application and a GUI framework. The GUI personalization application then computes a behavioral simplification for the first GUI based on the interactions and the GUI framework. Subsequently, the GUI personalization application modifies the first GUI based on the behavioral simplification to generate a second GUI for the user that is associated with the software application and the GUI framework. Advantageously, the GUI personalization application can more efficiently and reliably improve the quality of the overall user experience when interacting with the software application across a wider range of users relative to prior art approaches.

20 Claims, 3 Drawing Sheets

(51) Int. Cl.
G06F 11/34 (2006.01)
G06N 20/00 (2019.01)
G06N 5/046 (2023.01)
G06N 3/08 (2023.01)
G06F 3/0484 (2022.01)
H04N 1/00 (2006.01)

(52) U.S. Cl.
CPC ...... *G06F 11/3447* (2013.01); *G06F 11/3692* (2013.01); *G06N 3/08* (2013.01); *G06N 5/046* (2013.01); *G06N 20/00* (2019.01); *H04N 1/00509* (2013.01)

(56) References Cited

U.S. PATENT DOCUMENTS

| | | | | |
|---|---|---|---|---|
| 2016/0125842 | A1* | 5/2016 | Weinberg | G06F 3/14 345/629 |
| 2016/0259840 | A1 | 9/2016 | Zheng et al. | |
| 2018/0349793 | A1 | 12/2018 | Triolo et al. | |
| 2019/0250891 | A1* | 8/2019 | Kumar | G06K 9/6218 |
| 2019/0339820 | A1* | 11/2019 | Wu | G06N 20/00 |
| 2020/0133641 | A1* | 4/2020 | Sinn | G06F 16/954 |
| 2020/0184535 | A1* | 6/2020 | Barkan | G06F 16/252 |

OTHER PUBLICATIONS

Arulkumaran et al., "A Brief Survey of Deep Reinforcement Learning" IEEE Special issue on deep learning for image understanding, arXiv:1708.05866v2 [cs.LG], Sep. 28, 2017, pp. 1-16.

Yu et al., "Model-based Deep Reinforcement Learning for Dynamic Portfolio Optimization", arXiv:1901.08740v1 [cs.LG], Jan. 25, 2019, 21 pages.

Nagabandi et al., "Model-based Reinforcement Learning with Neural Network Dynamics", Berkeley Artficial Intelligence Research, http://bair.berkeley.edu/blog/2017/11/30/model-based-rl/, Nov. 30, 2017, 14 pages.

Chua et al., "Deep Reinforcement Learning in a Handful of Trials using Probabilistic Dynamics Models", 32nd Conference on Neural Information Processing Systems, Montréal, Canada, 2018, 12 pages.

Amodei et al., "Learning from Human Preferences", https://openai.com/blog/deep-reinforcement-learning-from-human-preferences/, Jun. 13, 2017, 9 pages.

Bajcsy et al., "Learning Robot Objectives from Physical Human Interaction", 1st Conference on Robot Learning (CoRL 2017), proceedings.mlr.press/v78/bajcsy17a/bajcsy17a.pdf, 2017, 10 pages.

Beltramelli et al., "pix2code: Generating Code from a Graphical User Interface Screenshot", https://github.com/tonybeltramelli/pix2code, pp. 1-9, 2021.

Wix.Com, create your stunning website with Wix ADI, https://www.wix.com/freesitebuilder/adi-get-access, 6 pages, 2021.

"The Grid | AI Websites That Design Themselves", https://www.youtube.com/watch?v=OXA4-5x31V0, 3 pages, 2021.

Gajos et al., "Improving User Interface Personalization", Santa Fe, New Mexico, USA ACM 1-58113-962-4/04/0010, UIST '04, Oct. 24-27, 2004, 2 pages.

Feng et al., "Intelligent Context-Aware and Adaptive Interface for Mobile LBS", Hindawi Publishing Corporation Computational Intelligence and Neuroscience vol. 2015, Article ID 489793, http://dx.doi.org/10.1155/2015/489793, 2015, 11 pages.

Andrew, Paul, "Understanding the Potential of Adaptive User Interfaces", https://speckyboy.com/adaptive-user-interfaces/, 2018, 11 pages.

* cited by examiner

TECHNIQUES FOR PERSONALIZING GRAPHICAL USER INTERFACES BASED ON USER INTERACTIONS

BACKGROUND

Field of the Various Embodiments

The various embodiments relate generally to computer science and graphical user interfaces for computing devices and, more specifically, to techniques for personalizing graphical user interfaces based on user interactions.

Description of the Related Art

A typical graphical user interface includes a variety of graphical user interface elements that enable users to visually interact with and access the functions and operations of an associated application in order to achieve some desired outcome. For example, a graphical user interface for a typical video streaming service could include graphical user interface elements that enable users to browse a library of video titles, select a video title from the library, and control the playback of a selected video title such that ultimately a given user can view a video that is of interest to that user.

In a typical approach to designing a graphical user interface, an application provider identifies common preferences and common outcomes that are shared across a majority of users and then designs the graphical user interface to optimize the user interactions with the graphical user interface with respect to those common preferences and common outcomes. Among other things, the resulting graphical user interface usually provides efficient, specialized shortcuts that enable users to efficiently achieve each of the common outcomes and also includes additional, more generalized graphical user interface elements that enable users to achieve various other outcomes. One drawback of providing a single graphical user interface for an application is that most, if not all, users have individual preferences and/or desired individual outcomes for which the graphical user interface is not optimized. As a result, many users can end up having to execute time-consuming and, sometimes, non-intuitive sequences of actions (e.g., clicking, scrolling, entering text, etc.) via the graphical user interface to effect those individualized preferences and outcomes. As a result, the overall quality of the user experience associated with the application can be degraded for many users.

To reduce the types of inefficiencies described above, some application providers generate multiple versions of a graphical user interface, where each version is customized for the aggregate preferences and the aggregate outcomes associated with a different segment of users. For example, a provider of a video streaming service could determine that, when using the graphical user interface associated with the service, more frequent users usually use a search bar instead of a recommendation browser panel to access and view the last episode of a television show. Further, the provider could determine that these more frequent users repeatedly execute a sequence of actions that includes typing the name of a television show into the search bar, navigating to the last season of the television show, navigating to the last episode in the last season, and finally selecting the last episode for viewing. Accordingly, for these more frequent users, the provider could generate a customized version of the graphical user interface that includes a prominent search bar and automatically selects the last episode of a television show for viewing when a user types the title of the television show into the search bar.

One drawback of generating multiple customized versions of a graphical user interface is that identifying aggregate preferences and aggregate outcomes for different user segments and then optimizing the graphical user interface for each different user segment is a primarily-manual, time-consuming process. Consequently, generating more than a few customized versions of a graphical user interface for a single application becomes impractical for application providers. Further, in situations where an application has a wide variety of users, generating only a few customized versions of a graphical user interface typically leaves many users without a customized version of the graphical user interface. For example, if none of the versions of a graphical user interface for a video streaming service is customized for infrequent users, then an infrequent user could end up having to repeat a lengthy sequence of actions, such as those described above, each time that user wants to access and view the first episode of a television show. For these users, the overall quality of the user experience can be degraded and can remain degraded when using the relevant application.

As the foregoing illustrates, what is needed in the art are more effective techniques for generating graphical user interfaces for users.

SUMMARY

One embodiment of the present invention sets forth a computer-implemented method for generating a graphical user interface (GUI) for a software application. The method includes performing one or more tracking operations to determine a first plurality of interactions between a first user and a first GUI that is associated with the software application and a first GUI framework; computing a behavioral simplification for the first GUI based on the first plurality of interactions and the first GUI framework; and modifying the first GUI based on the behavioral simplification to generate a second GUI for the first user that is associated with the software application and the first GUI framework.

At least one technical advantage of the disclosed techniques relative to the prior art is that, with the disclosed techniques, a graphical user interface for a given application can be personalized automatically for each user of the application such that multiple actions that the user often executes when interacting with the application are consolidated into a single action. As a result, customized graphical user interfaces can be generated across wider varieties of users than is possible with prior art approaches that involve customizing different versions of a graphical user interface to reflect the aggregate preferences and the aggregate outcomes of different segments of users. Accordingly, with the disclosed techniques, the quality of the overall user experience when interacting with a particular application via a graphical user interface is improved across a wider range of different users relative to prior art approaches. These technical advantages provide one or more technological improvements over prior art techniques.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
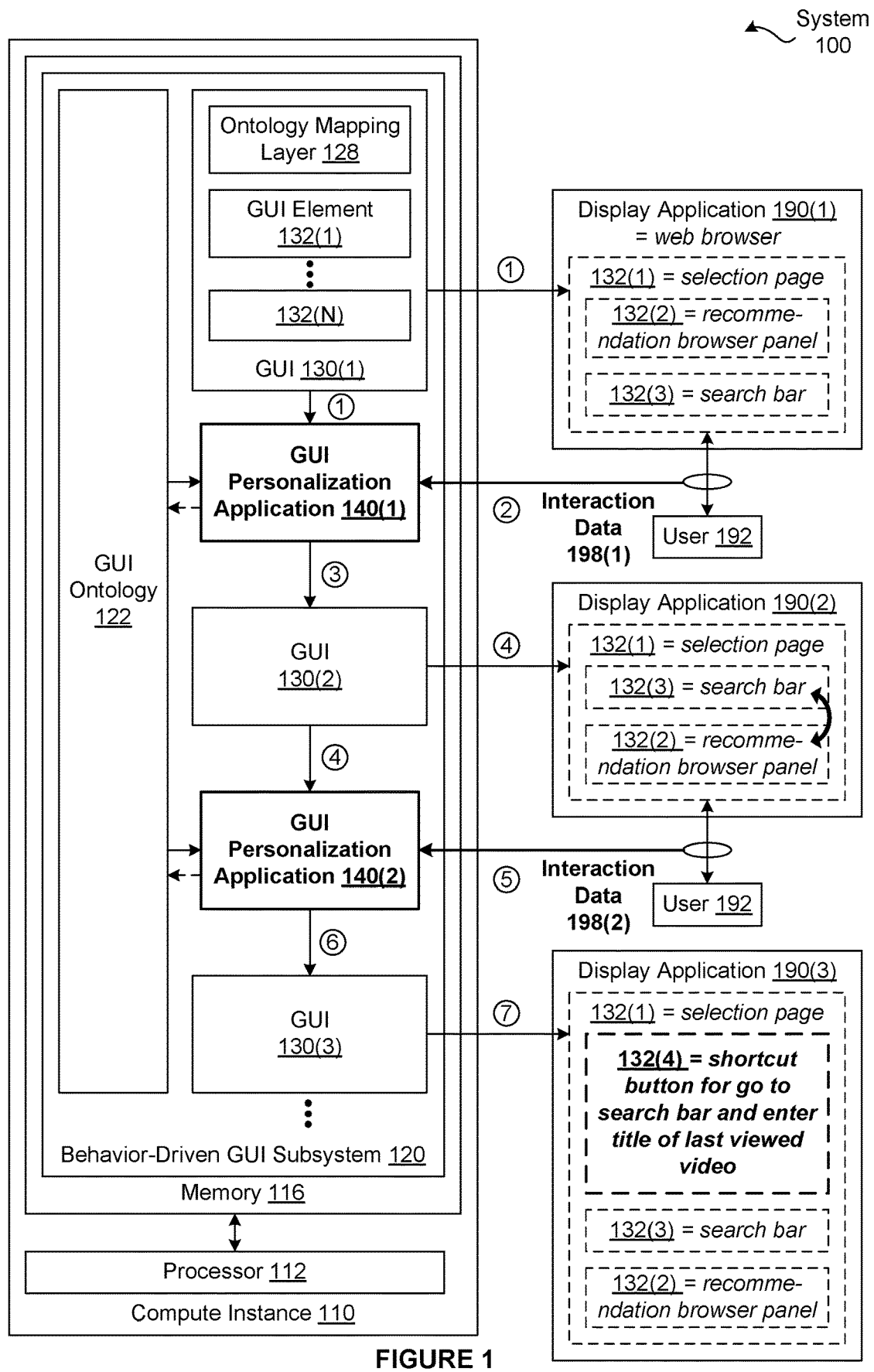
FIG. 1 is a conceptual illustration of a system configured to implement one or more aspects of the various embodiments.

FIG. 1 is a conceptual illustration of a system 100 configured to implement one or more aspects of the various embodiments. As shown, the system 100 includes, without limitation, display applications 190(1)-109(3) (hereinafter "display application(s) 190"), a user 192, and a compute instance 110. For explanatory purposes, multiple instances of like objects are denoted with reference numbers identifying the object and parenthetical alphanumeric character(s) identifying the instance where needed. Also, for explanatory purposes, multiple snapshots of a single object, where each snapshot is associated with a different point in time, are denoted with reference numbers identifying the object and a parenthetical number identifying the point in time where needed.

Each of the display applications 190(1)-190(3) depicts a snapshot of the display application 190 at a different point in time. In alternate embodiments, the system 100 may include, without limitation, any number of different display applications 190. Each of the display applications 190 may be any type of application capable of displaying graphical data (e.g., a web browser) and may execute on any type of user device (e.g., smartphone, smart TV, desktop computer, tablet, laptop, game console, set top box, etc.). In the same or other alternate embodiments, the system 100 may include, without limitation, any number of users 192.

Any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110. In the same or other alternate embodiments, each of the compute instances 110 may be implemented in a cloud computing environment, implemented as part of any other distributed computing environment, or implemented in a stand-alone fashion.

As shown, the compute instance 110 includes, without limitation, a processor 112 and a memory 116. The processor 112 may be any instruction execution system, apparatus, or device capable of executing instructions. For example, the processor 112 could comprise a central processing unit, a graphics processing unit, a controller, a micro-controller, a state machine, or any combination thereof. The memory 116 of a given compute instance 110 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random-access memory, read only memory, floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory, an optical storage device, a magnetic storage device, or any suitable combination of the foregoing.

In general, each of the compute instances 110 is configured to implement one or more applications or subsystems of applications. For explanatory purposes only, each application is described as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to generate graphical user interfaces ("GUIs") 130 that enable the user 192 to visually interact with and access the functions and operations of an associated application (not shown). The GUIs 130 may be associated with any type of application, such as a stand-alone software application or a software service (e.g., a web-based service). For explanatory purposes only, the GUIs 130 refer to multiple snapshots of a single GUI 130, where each snapshot is associated with a different point in time. Where needed, different snapshots of the GUI 130 are denoted with the reference number of 130 and a parenthetical number identifying the point in time. As described in greater detail below, the GUIs 130(1)-130(3) depict snapshots of sequentially modified versions of the single GUI 130 as displayed by the display applications 190(1)-190(3), respectively, at three different points in time.

As described in detail previously herein, one conventional approach to generating GUIs involves performing a primarily-manual, time-consuming design process to generate multiple versions of a GUI, where each version is customized for the aggregate preferences and the aggregate outcomes associated with a different segment of users. However, because of the amount of manual effort and amount of time required to generate each version of the GUI, generating more than a few customized versions of a graphical user interface for a single application becomes impractical for application providers. Further, in situations where an application has a wide variety of users, generating only a few customized versions of a GUI typically leaves many users without a customized version of the graphical user interface.

For these users, the overall quality of the user experience can be degraded and can remain degraded when using the relevant application.

Iteratively Personalizing a Graphical User Interface

To enable an application provider to efficiently and reliably increase the overall quality of the user experience associated with an application across a wide variety of users, the system 100 includes, without limitation, a behavior-driven GUI subsystem 120. In general, the behavior-driven GUI subsystem 120 iteratively personalizes the GUI 130 for the user 192 based on the behavior of the user 192.

The behavior-driven GUI subsystem 120 resides in the memory 116 and executes on the processor 112 of the compute instance 110. In some alternate embodiments, the functionality of the behavior-driven GUI subsystem 120 may be distributed across any number of applications and/or subsystems that execute on any number of compute instances 110 in any combination. As shown, the behavior-driven GUI subsystem 120 includes, without limitation, a GUI ontology 122, any number of GUIs 130, and a GUI personalization application 140. For explanatory purposes only, the GUI personalization applications 140(1) and 104(2) refer to different snapshots of the single GUI personalization application 140, where each snapshot is associated with a different point in time.

The GUI ontology 122 is a GUI framework for an associated application that modularizes different GUI elements 132(1)-132(N) (hereinafter "GUI elements 132") and associated actions (not shown in FIG. 1) to facilitate automatic optimization of the GUIs 130 in real-time. The GUI ontology 122 is described in greater detail below in conjunction with FIG. 2. Each of the GUI elements 132 is a viewable object and may be non-hierarchical or hierarchical. Some examples of non-hierarchical GUI elements 132 include, without limitation, radio buttons, dropdown lists, toggles, text fields, sliders, icons, progress bars, tool tips, message boxes, panes, panels, icons, thumbnails, etc. Some examples of hierarchical GUI elements 132 include, without limitation, viewable pages of GUI elements 132, segments of viewable pages, etc.

Each of the GUI elements 132 may be associated with any number of actions, any number of pathways, any number of parameters, any number of graphical characteristics, any number of labels, and so forth. As referred to herein, an "action" is any activity that may be performed or initiated by the user 192 or the GUI 130. Some examples of actions that can be manually performed and/or initiated by the user 192 and/or programmatically performed and/or initiated by the GUI 130 include, without limitation, clicking on a radio button, navigating to a search bar, entering text in a text field, and so forth. The GUI 130 may programmatically perform and/or initiate any number and/or types of actions in any technically feasible fashion. For instance, in one or more embodiments, the GUI 130 may simulate user interactions via an application programming interface ("API"), such as a visual scripting API. A sequence of actions is also referred to herein as a "pathway."

Each of the GUIs 130 is a different manifestation of the GUI ontology 122. For explanatory purposes only, different GUIs 130 are also referred to herein as different versions of the GUI 130. As shown for GUI 130(1), each of the GUIs 130 includes, without limitation, one or more of the GUI elements 132 and an ontology mapping layer 128. Notably the number and type of the GUI elements 132 may vary between different versions of the GUI 130 (e.g., between the GUIs 130(1) and 130(2)).

The ontology mapping layer 128 maps each of the GUI elements 132 included in the GUI 130 to a corresponding GUI element definition (not shown in FIG. 1) included in the GUI ontology 122. In some embodiments, the ontology mapping layer 128 may map any number and type of other elements included in the GUI 130 to corresponding GUI element definitions included in the GUI ontology 122. For instance, in some embodiments, for each of the GUI elements 132, the ontology mapping layer 128 maps any number of associated action(s) and pathway(s) to corresponding definitions included in the GUI ontology 122.

In some embodiments, the GUI personalization application 140 uses the ontology mapping layer 128 to map each GUI element 132, action, and pathway to an associated label specified in the GUI ontology 122 and then configures machine learning model(s) to operate based on the labels. In this fashion, the GUI ontology 122 facilitates using the same machine learning model(s), the same GUI personalization application 140, and the same behavior-driven GUI subsystem 120 to personalize GUIs 130 for a wide range of applications. The GUI ontology 122 therefore increases the scalability of the machine learning model(s), the GUI personalization application 140, and the behavior-driven GUI subsystem 120.

The behavior-driven GUI subsystem 120 configures the GUI personalization application 140 to iteratively optimize the GUI 130(1) for the user 192 based on the behavior of the user 192. Prior to the first iteration, the behavior-driven GUI subsystem 120 acquires the GUI 130(1). The behavior-driven GUI subsystem 120 may acquire the GUI 130(1) in any technically feasible fashion. For instance, in one or more embodiments, the behavior-driven GUI subsystem 120 may read the GUI 130(1) from a predetermined memory location.

Subsequently, the behavior-driven GUI subsystem 120 transmits the GUI 130(1) to the display application 190 and configures the GUI personalization application 140 to iteratively perform optimization operations on the GUI 130(1) based on interaction data 198 and the GUI ontology 122. For explanatory purposes only and as described previously herein, different parenthetical numbers may be used to denote snapshots of the GUI 130, the display application 190, and the GUI personalization application 140 at different points in time. Furthermore, different parenthetical numbers may be used herein to denote different instances of the interaction data 198 that are associated with different periods of time.

As depicted in FIG. 1, the GUI 130(1) and the display application 190(1) are associated with a first point in time. Between the first point in time and a subsequent second point in time, the user 192 interacts with the GUI 130(1), thereby generating the interaction data 198(1). The GUI personalization application 140(1), the GUI 130(2), and the display application 190(2) are associated with the second point in time. Between the second point in time and a subsequent third point in time, the user 192 interacts with the GUI 130(2), thereby generating the interaction data 198(2). The GUI personalization application 140(2), the GUI 130(3), and the display application 190(3) are associated with the third point in time.

More precisely and as explicitly shown in FIG. 1, the GUI personalization application 140(1) performs optimization operations on the GUI 130(1) based on the interaction data 198(1) and the GUI ontology 122 to generate the GUI 130(2). The interaction data 198(1) includes, without limitation, any amount and/or type of information that is associated with interactions between the user 192 and the GUI 130(1). For instance, in some embodiments, the interaction data 198(1) includes, without limitation, clicks that the user 192 performs as the user 192 interfaces with the GUI 130(1). Subsequently, the GUI personalization application 140(2) performs optimization operations on the GUI 130(2) based on the interaction data 198(2) to generate the GUI 130(3). The behavior-driven GUI subsystem 120 may continue to iteratively modify the GUI 130 in this fashion for any number of iterations. When the behavior-driven GUI subsystem 120 ceases iteratively modifying the GUI 130, the behavior-driven GUI subsystem 120 stores the most recently generated GUI 130 (e.g., the GUI 130(3)) in a memory location that is accessible by the user 192 and/or any number and/or type of display applications 190.

The behavior-driven GUI subsystem 120 may determine when to cease iteratively modifying the GUI 130 in any technically feasible fashion. For instance, in one or more embodiments, the behavior-driven GUI subsystem 120 continues to iteratively modify the GUI 130 until a user session is complete. For explanatory purposes only and as used herein, a "user session" refers to a period of time that starts when the user 192 or the display application 190 causes the behavior-driven GUI subsystem 120 to start executing and ends when the user 192 or the display application 190 causes the behavior-driven GUI subsystem 120 to cease executing. The user 192 and/or the display application 190 may cause the behavior-driven GUI subsystem 120 to start executing and/or cease executing in any technically feasible fashion. In one or more embodiments, some examples of actions that the user 192 may perform to cause the behavior-driven GUI subsystem 120 to cease executing include, without limitation, issuing an exit command, closing the GUI 130, turning off the user device on which the display application 190 is executing, etc.

The GUI personalization application 140 may personalize the GUI 130 in any technically feasible fashion based, at least in part, on the interaction data 198. For instance, in some embodiments, the GUI personalization application 140 includes, without limitation, a set of rules for personalizing the GUI 130. The GUI personalization application 140 determines any number of applicable rule(s) from the set of rules based on at least one of the interaction data 198 and the GUI 130. The GUI personalization application 140 then modifies the GUI 130 based on the applicable rule(s).

In the same or other embodiments, the GUI personalization application 140 may perform any number and/or type of optimizations operations on the GUI 130 based on any amount and type of associated interaction data 198 and any number and type of optimization objectives. For instance, in some embodiments, the GUI personalization application 140 may implement any number of algorithms and/or machine learning techniques, in any combination, to perform single-objective or multi-objective optimization operations on the GUI 130. The optimization objectives may be expressed in any technically feasible fashion. In some embodiments, the optimization objectives may be expressed via one or more objective functions, loss functions, cost functions, reward functions, and so forth.

In some embodiments, the optimization objectives are intended to improve the effectiveness of the GUI 130 for the user 192. As used herein, improving the effectiveness of the GUI 130 for the user 192 refers to increasing the overall quality of the user experience when the user 192 interacts with the associated application via the GUI 130. For instance, in some embodiments, the optimization objectives may be to maximize the number of videos that the user 192 views and to minimize the average number of clicks that the user 192 executes to view a video.

Advantageously, the GUI personalization application 140 may make any number (including zero) of non-behavioral modifications and any number (including zero) of behavioral modifications to the GUI 130 to generate a new version of the GUI 130. Some examples of non-behavioral modifications include, without limitation, changing the color of one of the GUI elements 132, changing the font of the text associated with one of the GUI elements 132, changing the size of one of the GUI elements 132, changing a shape associated with one of the GUI elements 132, reordering and/or repositioning any number of the GUI elements 132 within a hierarchical GUI element 132, etc. Non-behavioral modifications are also referred to herein as "non-behavioral preferences."

Some examples of behavioral modifications include, without limitation, changing an action associated with one of the GUI elements 132 to another action or a pathway, changing a pathway associated with one of the GUI elements 132 to a pathway or another action, adding a new GUI element 132 to one of the hierarchical GUI elements 132, removing one of the GUI elements 132 from one of the hierarchical GUI elements 132, and so forth. In general, the behavioral modifications are intended to simplify the GUI 130 as used by the user 192. For example, any number of the behavioral modifications may involve modifying one of the GUI elements to execute one or more actions resulting from at least a portion of the interaction data 198 when activated. Behavioral modifications are also referred to herein as "behavioral simplifications."

As depicted with dashed arrows in FIG. 1, in some embodiments, the GUI personalization application 140 may modify the GUI ontology 122 in any technically feasible fashion. For instance, in some embodiments, the GUI personalization application 140 may add a new pathway definition (not shown) to the GUI ontology 122. In the same or other embodiments, the GUI personalization application 140 may add a new GUI element definition (not shown) to the GUI ontology 122 or modify an existing GUI element definition.

As described in greater detail below in conjunction with FIG. 2, in some embodiments, the GUI personalization application 140 implements any number and/or type of reinforcement learning techniques to optimize the GUI 130. Unlike conventional applications of reinforcement learning that involve an avatar agent performing actions to learn how to run in a simulated physics environment, the GUI personalization application 140 makes changes to the GUI 130 to learn how to streamline the behavior of the user 192 and, therefore, the user experience for the user 192.

For explanatory purposes only, a series of numbered bubbles 1-4 depicts an exemplary series of operations that occur when the behavior-driven GUI subsystem 120 executes two optimization iterations to personalize the GUI 130 for the user 192. As depicted with the two bubbles numbered 1, the behavior-driven GUI subsystem 120 transmits the GUI 130(1) to the display application 190 and inputs the GUI 130(1) into the GUI personalization application 140(1). The display application 190 is a web browser, and the display application 190(1) depicts the GUI 130(1). The GUI 130(1) is associated with a video streaming service and includes, without limitation, the hierarchical GUI element 132(1) of a selection page. The GUI element 132(1) of selection page includes, without limitation, the GUI element 132(2) of a recommendation browser panel and the GUI element 132(3) of a search bar. As shown, the GUI element 132(2) of recommendation browser panel is originally positioned above the GUI element 132(3) of search bar within the GUI element 132(1) of selection page.

As the user 192 interacts with the GUI 130(1) and as depicted with the bubble numbered 2, the GUI personalization application 140(1) tracks the interactions via the interaction data 198(1). After an update condition (not shown in FIG. 1) is met and as depicted with the bubble numbered 3, the GUI personalization application 140(1) performs optimization operations on the GUI 130(1) based on the interaction data 198(1) and the GUI ontology 122 to generate the GUI 130(2).

The update condition may specify that the update is triggered based on any number and/or type of criteria associated with any amount and/or type of data (e.g., the interaction data 198). For instance, in some embodiments, the update condition is that the user 192 logs out of the display application 190. In some other embodiments, the update condition may specify an interaction-related threshold (e.g., total number of interactions) or time threshold that, when reached, triggers the update subject to the constraint that the update cannot occur while the user 192 is interacting with the GUI 130. In yet other embodiments, the update condition may specify that the user 192 begins to interact with a different viewable page.

For explanatory purposes only, the interaction data 198(1) indicates that a prevalent behavior of the user 192 is to go immediately to the GUI element 132(3) of search bar to look for a video title. For this reason, the GUI personalization application 140(1) determines that the importance of the GUI element 132(3) of search bar to the user 192 is higher than the importance of the GUI element 132(2) of recommendation browser panel to the user 192. To increase the effectiveness of the GUI 130 for the user 192, the GUI personalization application 140(1) reorders the GUI element 132(2) of recommendation browser panel and the GUI element 132(3) of search bar so that in the GUI 130(2), the GUI element 132(3) of search bar appears before the GUI element 132(2) of recommendation browser panel within the hierarchical GUI element 132(1) of selection page.

As depicted with the two bubbles numbered 4, the behavior-driven GUI subsystem 120 transmits the GUI 130(2) to the display application 190 and inputs the GUI 130(2) into the GUI personalization application 140(2). The display application 190(2) depicts the GUI 130(2) and, as shown, the GUI element 132(3) of search bar appears before the GUI element 132(2) of recommendation browser panel within the hierarchical GUI element 132(1) of selection page.

As the user 192 interacts with the GUI 130(2) and as depicted with the bubble numbered 5, the GUI personalization application 140(2) tracks the interactions via the interaction data 198(2). After the update condition is met and as depicted with the bubble numbered 6, the GUI personalization application 140(2) performs optimization operations on the GUI 130(2) based on the interaction data 198(2) and the GUI ontology 122 to generate the GUI 130(3).

For explanatory purposes only, the interaction data 198(2) indicates that a prevalent behavior of the user 192 is to go immediately to the GUI element 132(3) of search bar and enter the title of the last viewed video. For this reason, the GUI personalization application 140(2) generates a new GUI element 132(4) of a shortcut button and associates the GUI element 132(4) with the pathway of "go to search bar and enter title of last viewed video." Although not depicted, the GUI personalization application 140(2) generates the new GUI element 132(4) based on a GUI element definition (not shown in FIG. 1) included in the GUI ontology 122. The GUI personalization application 140(2) then adds the GUI element 132(4) at the top of the hierarchical GUI element 132(1) of selection page.

As depicted with the bubble numbered 7, the behavior-driven GUI subsystem 120 transmits the GUI 130(3) to the display application 190. Although not depicted in FIG. 1, the behavior-driven GUI subsystem 120 also inputs the GUI 130(3) into the GUI personalization application 140(3). The display application 190(3) depicts the GUI 130(3) and, as shown, the GUI element 132(4) of shortcut button appears within the hierarchical GUI element 132(1) of selection page.

As the above example illustrates, unlike prior-art techniques, the behavior-driven GUI subsystem 120 efficiently and automatically personalizes the GUI 130 for the user 192. Because the behavior-driven GUI subsystem 120 automatically generates new versions of the GUI 130, personalized GUIs 130 can be generated across wider varieties of users than is possible with conventional, primarily manual approaches to customizing GUIs. For instance, in some alternate embodiments, the behavior-driven GUI subsystem 120 executes a different iterative optimization process for each of N users 192, where N is a positive integer. Consequently, at any given point in time after the first optimization iterations are complete, the behavior-driven GUI subsystem 120 includes, without limitation, N different optimized GUIs 130 where each of the optimized GUIs 130 is personalized for a different user 192.

In alternate embodiments, the behavior-driven GUI subsystem 120 may be configured to generate a different customized GUIs 130 for each of any number of segments of users 192, and the techniques described herein are modified accordingly. For instance, in some alternate embodiments, the GUI personalization application 140 receives interaction data 198 from each of the users 192 included in a segment of users 192 and performs optimization operations on the GUI 130 based on the aggregate behavior of the segment of users 192.

Note that the techniques described herein are illustrative rather than restrictive, and may be altered without departing from the broader spirit and scope of the invention. Many modifications and variations on the functionality provided by the behavior-driven GUI subsystem 120 and the GUI personalization application 140 will be apparent to those of ordinary skill in the art without departing from the scope and spirit of the described embodiments.

It will be appreciated that the system 100 shown herein is illustrative and that variations and modifications are possible. For example, the functionality provided by the behavior-driven GUI subsystem 120, the GUI personalization application 140, and the display application 190 as described herein may be integrated into or distributed across any number of software applications (including one), and any number of components of the system 100. Further, the connection topology between the various units in FIG. 1 may be modified as desired.

Optimizing GUIs Based on User Interactions

Figure 2:
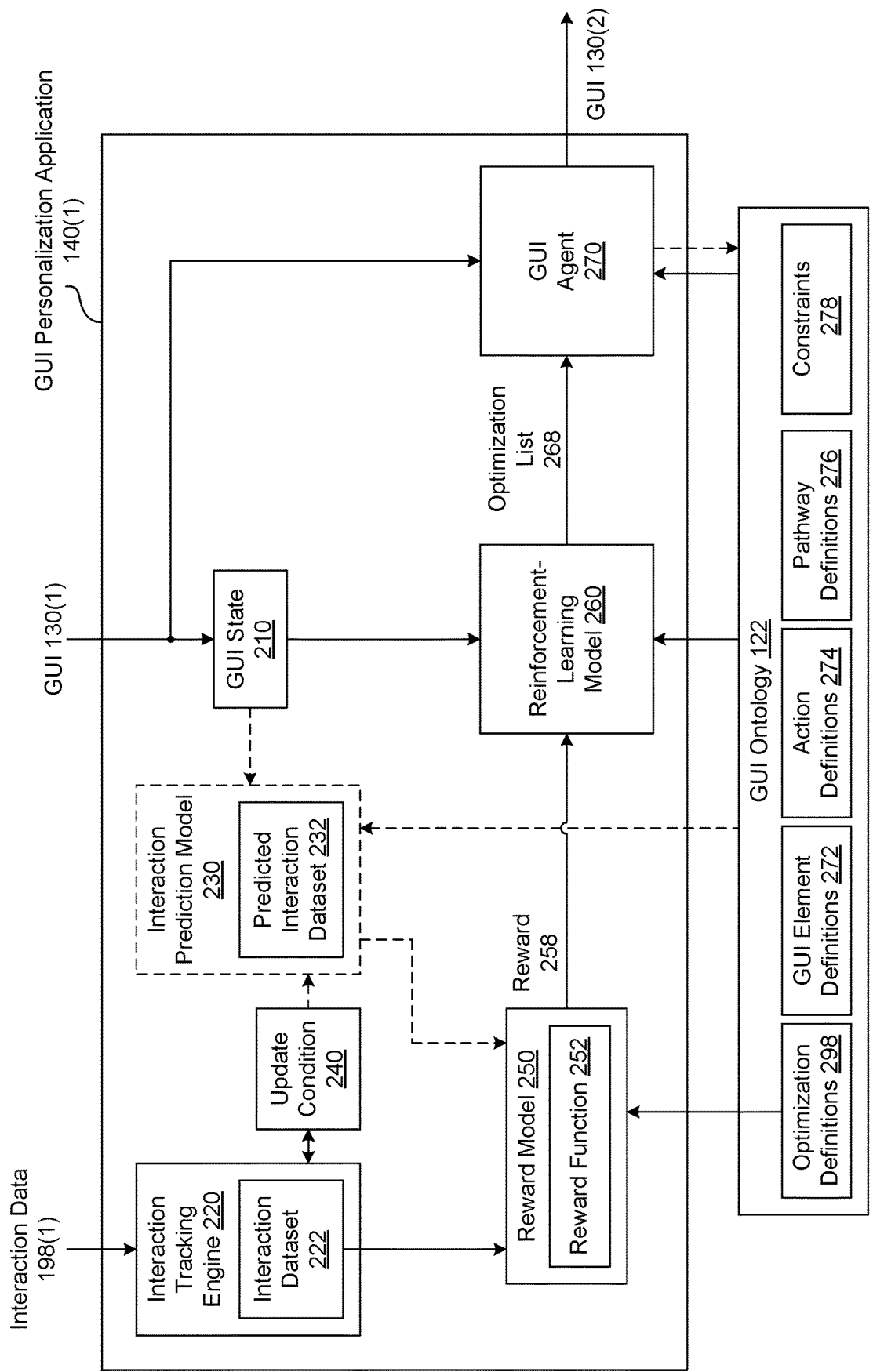
FIG. 2 is a more detailed illustration of the graphical user interface personalization application of FIG. 1, according to various embodiments.

FIG. 2 is a more detailed illustration of the GUI personalization application 140(1) of FIG. 1, according to various embodiments. In the embodiments depicted in FIG. 2, the GUI personalization application 140(1) is a model that implements machine learning techniques based on conventional reinforcement learning. In operation, the GUI personalization application 140(1) modifies the GUI 130(1) based on the interaction data 198(1) and the GUI ontology 122 to generate the GUI 130(2) that is personalized for the user 192. The GUI personalization application 140(1) is also referred to herein as a machine learning model and a reinforcement-learning model.

As described previously herein in conjunction with FIG. 1, the GUI 130(1) and the GUI 130(2) are different manifestations of the GUI ontology 122, and the GUI 130(2) is associated with a point in time that is later than a point in time that is associated with the GUI 130(1). The GUI ontology 122 includes, without limitation, any number of GUI element definitions 272, any number of action definitions 274, any number of pathway definitions 276, any number of constraints 278, and any number of optimization definitions 298.

Each of the GUI element definitions 272 defines a different type of GUI element 132 and may be used to generate any number of GUI elements 132 of the corresponding type. Any number of the GUI element definitions 272 may define non-hierarchical types of GUI elements 132 and any number (including none) of the GUI element definitions 272 may define hierarchical types of GUI elements 132. For instance, in some embodiments, the GUI ontology 122 includes, without limitation, the GUI element definitions 272 for any number of non-hierarchical types of GUI elements 132, the GUI element definitions 272 for any number of viewable pages that each include any number of GUI elements 132, the GUI element definitions 272 for any number of segments that each include multiple viewable pages, and the GUI element definitions 272 for any number of other hierarchical GUI elements 132.

Each of the GUI element definitions 272 includes, without limitation, any amount and/or type of information that defines the associated type of GUI element 132. Some examples of types of information that may be included in each of the GUI element definitions 272 include, without limitation, labels that can facilitate machine learning, parameter definitions, associated actions that are defined via the action definitions 274, associated pathways that are defined via the pathway definitions 276, required GUI elements 132, optional GUI elements 132, layout requirements, layout options, layout recommendations, layout constraints, color requirements, color options, displayed content options, sizing options, shape options, font options, and so forth.

For example, referring back to FIG. 1, the GUI element definition 272 used to generate the GUI element 132(1) could specify the label "selection page," one required GUI element 132(3) associated with the label "search bar," one required GUI element 132(2) associated with the label "recommendation browser panel," and any number of optional GUI elements 132(4) associated with the label of "shortcut button." Further, the GUI element definition 272 used to generate the GUI element 132(1) could also specify any number of acceptable combinations and/or groupings of the GUI elements 132 within each GUI element 132 of selection page.

In some embodiments, each GUI element definition 272 may also specify, without limitation, any amount and/or type of optional targeted GUI elements 132. Each targeted GUI element 132 is associated with at least one classification, such as a content type (e.g., genre), a user type, etc. For example, the GUI element 132 of "selection page" could include a targeted GUI element 132 that provides parental guidance information and is associated with users 192 that are classified as parents.

Each of the action definitions 274 defines a different action (not shown) and each of the pathway definitions 276 defines a different pathway (i.e., a sequence of actions). In alternate embodiments, actions and pathways may be defined in any technically feasible fashion. For instance, in some alternate embodiments, each pathway may be defined via either a corresponding pathway definition 276 or as a sequence of actions defined via a sequence of corresponding action definitions 274.

In general, each of the GUI element definitions 272 may specify any number and/or type of associations with any number (including none) of actions and/or any number of pathways (including none) in any technically feasible fashion. For instance, in some embodiments, any number of the GUI element definitions 272 may specify that an activating action (e.g., a click, etc.) automatically triggers an associated action or an associated pathway. In the same or other embodiments, any number of the GUI element definitions 272 may specify a list of permissible actions and/or permissible pathways that can result from an activating action. When a new GUI element 132 is generated based on the GUI element definition 272, the GUI element 132 is configured to execute one of the permissible actions, a sequence of the permissible actions, or one of the permissible pathways when the activating action occurs. An activating action is also referred to herein as an "activation."

The GUI ontology 122 may specify any type of restrictions associated with implementing (e.g., generating, optimizing, modifying, using, etc.) the GUIs 130 in any technically feasible fashion. In some embodiments, the restrictions may be specified via any number and/or combination of the GUI element definitions 272, the action definitions 274, the pathway definitions 276, the constraints 278, and the optimization definitions 298 in any combination. In particular, the GUI ontology 122 may specify action limits to reduce the likelihood that the GUI 130 automatically performs non-intuitive state jumps that could confuse the user 192.

For instance, in some embodiments, each of the GUI elements 132 is associated with at most one permissible action or permissible pathway to limit non-intuitive state jumps in a general fashion. In the same or other embodiments, the GUI ontology 122 specifies that at most one modification to the actions and pathways associated with the GUI 130 can be made within a specific time period (e.g., a user session). For explanatory purposes only, in one or more embodiments, FIG. 1 depicts a single user session. In some embodiments, any number of the constraints 278 limit specific non-intuitive state jumps. For example, one of the constraints 278 could specify that the GUI 130 cannot execute an action of playing a specific video title immediately after the action of clicking on a search bar.

Each of the optimization definitions 298 defines a different optimization objective that is intended to increase the effectiveness of the GUI 130 and may be associated with any number (including none) and/or type of outcomes. Some examples of optimization objectives include, without limitation, maximizing the amount of time the user 192 spends interacting with the associated application, maximizing the number of videos that the user 192 views, minimizing the number of clicks that the user 192 executes to view a video, maximizing the number of episodes that the user 192 binges in sequential order, and maximizing the percentage of a franchise that the user 192 views, etc. The optimization definitions 298 may define optimization objectives in any technically feasible fashion and the GUI personalization application 140 may use any number (including none) of the optimization definitions 298 in any technically feasible fashion to optimize the GUI 130 for the user 192.

As shown, the GUI personalization application 140(1) includes, without limitation, a GUI state 210, an interaction tracking engine 220, an update condition 240, a reward model 250, a reinforcement-learning model 260, and a GUI agent 270. The GUI state 210 stores any amount and/or type of information associated with the GUI 130(1) as initially generated (e.g., before the GUI 130(1) is used by the user 192). The GUI personalization application 140(1) may generate the GUI state 210 in any technically feasible fashion. For instance, in some embodiments, the GUI personalization application 140(1) may set the GUI state 210 equal to the GUI 130(1). In some alternate embodiments, the GUI personalization application 140(1) may map information included in the GUI 130(1) to labels associated with the GUI ontology 122 to generate the GUI state 210, and the techniques described herein are modified accordingly.

The interaction tracking engine 220 includes, without limitation, an interaction dataset 222. Initially, the interaction tracking engine 220 generates an empty interaction dataset 222. As the interaction tracking engine 220 receives the interaction data 198(1) in real-time, the interaction tracking engine 220 stores the interaction data 198(1) in the interaction dataset 222. The interaction data 198(1) includes, without limitation, any amount and/or type of information that is associated with interactions between the user 192 and the GUI 130(1). For instance, in some embodiments, the interaction data 198(1) includes a clickstream that includes, without limitation, any number of clicks that the user 192 performs as the user 192 interacts with the GUI 130(1). Each click specifies, without limitation, the GUI element 132 that the user 192 clicked and any resulting action(s).

In some embodiments, the interaction tracking engine 220 stores the interaction data 198(1) in the interaction dataset 222 without modifying the interaction data 198(1). In other embodiments, the interaction tracking engine 220 may perform any number and/or type of operations on the interaction data 198(1) to generate the interaction dataset 222. In some alternate embodiments, any amount and/or type of user preference information may be included in the interaction data 198(1) and/or the interaction dataset 222. Some examples of user preference information include, without limitation, customized content recommendations (e.g., when the application is an e-commerce service or a video streaming service), favorite characters, colors, etc.

In general, the interaction tracking engine 220 may implement any number of tracking operations, database operations, processing operations, etc., to acquire the interaction data 198(1) and generate the interaction dataset 222. The interaction tracking engine 220 continues to store received interaction data 198(1) in the interaction dataset 222 until the interaction tracking engine 220 determines that the update condition 240 is met.

The update condition 240 specifies any number of prerequisites that are to be met before the GUI personalization application 140(1) modifies the GUI 130(1). For instance, in some embodiments, the GUI 130 is associated with a website and the update condition 240 is that the user 192 ends a current visit to the website. In some other embodiments, the update condition 240 is that the user 192 navigates to a new viewable page (e.g., the GUI element 132(1)) of the GUI 130). In yet other embodiments, the update condition 240 is a threshold, such as a minimum number of interactions or a maximum amount of time.

In some embodiments, the update condition 240 is based on statistics associated with the interaction dataset 222. For example, the update condition 240 could be that the interaction dataset 222 includes a click sequence associated with a common outcome (e.g., viewing a video) that is longer than the average length of common click sequences associated with a set of common outcomes. In some embodiments, the update condition 240 is associated with one or more constraints, such as that the GUI 130 cannot be modified while the user 192 is interacting with the GUI 130.

After the interaction tracking engine 220 determines that the update condition 240 is met, the interaction tracking engine 220 outputs a copy of the interaction dataset 222 to the reward model 250 and then clears the interaction dataset 222 stored therein. In alternate embodiments, the GUI personalization application 140 may determine when the update condition 240 is met and may provide the interaction dataset 222 to the reward model 250 in any technically feasible fashion.

As shown, the reward model 250 computes a reward 258 based on the interaction dataset 222 and any number (including none) of the optimization definitions 298. The reward 258 correlates to effectiveness of the GUI 130(1) with respect to the user 192. The reward model 250 computes the reward 258 based on a reward function 252. The reward model 250 may implement any type of reward function 252 in any technically feasible fashion.

For instance, in some embodiments, the reward function 252 is a static function that is selected to provide positive reinforcement to the reinforcement-learning model 260 when the behavior of the user 192 indicates that the reinforcement-learning model 260 has increased the effectiveness of the GUI 130. The reward function 252 may be associated with any number (including none) of the optimization definitions 298 and any portion of the interaction dataset 222.

For instance, the reward function 252 could be a weighted combination of the optimization objective of maximizing the number of videos that the user 192 views (specified via one of the optimization definitions 298) and the optimization objective of minimizing the number of clicks that the user 192 executes to view a video (specified via another of the optimization definitions 298). The reward function 252 would therefore be associated with the portion of the interaction dataset 222 that specifies the click stream sequences that culminate in the user 192 viewing a video.

In some alternate embodiments, the reward model 250 dynamically generates and/or modifies the reward function 252. The reward model 250 may dynamically generate and/or modify the reward function 252 in any technically feasible fashion. For instance, in some embodiments, the reward model 250 is a machine learning model that learns the reward function 252. The reward model 250 may learn the reward function 252 based on any amount and/or type of data associated with any number of users 192, any number of sessions, etc. For instance, in some embodiments, the reward model 250 learns a different reward function 252 for each of any number of user segments based on the GUI states 210 and the interaction datasets 222 associated with different users 192 included in the user segment. In the same or other embodiments, the reward model 250 may be configured to generate a new reward function 252 for each user session.

In some alternate embodiments, and as depicted via dashed boxes and arrows, the GUI personalization application 140(1) also includes, without limitation, an interaction prediction model 230. The interaction prediction model 230 is a machine learning model that predicts the actions, responses, etc. that a human would have when interacting with the GUI 130(1) based on the GUI state 210. The interaction prediction model 230 may be any type of machine learning model and may be generated in any technically feasible fashion. For instance, in some alternate embodiments, the behavior-driven GUI subsystem 120 trains or pre-trains the interaction prediction model 230 prior to executing the GUI personalization application 140(1). For example, the behavior-driven GUI subsystem 120 could train or pre-train the interaction prediction model 230 based on user interactions associated with any number of users 192 and a static version of the GUI 130 (e.g., the GUI 130(1)).

The interaction prediction model 230 generates a predicted interaction dataset 232 based on the GUI state 210 and, optionally, the GUI ontology 122. The predicted interaction dataset 232 includes, without limitation, any amount and/or type of data that is associated with predicted human interactions (e.g., actions, responses, etc.) with the GUI 130(1). After the interaction tracking engine 220 determines that the update condition 240 is met, the GUI personalization application 140(1) configures the reward model 250 to compute the reward 258 based on the interaction dataset 222, the predicted interaction dataset 232, and any number (including none) of the optimization definitions 298.

As shown, the reinforcement-learning model 260 computes an optimization list 268 based on the GUI state 210, the reward 258, and the GUI ontology 122. The optimization list 268 includes, without limitation, any number of recommended optimizations (not shown) for the GUI 130(1), where the recommended optimizations are intended to increase the effectiveness of the GUI 130(1). The recommended optimizations may include, without limitation, any number of behavioral simplifications (with respect to the user 192) and any number of non-behavioral (e.g., visual) modifications. The reinforcement-learning model 260 may compute the optimization list 268 in any technically feasible fashion. For instance, in some embodiments, the reinforcement-learning model 260 is a Deep Q Network that uses deep Q-learning techniques to generate the optimization list 268. In some such embodiments the reinforcement-learning model 260 learns a policy that maps the GUI state 210 to recommended optimizations for the associated GUI 130. In other embodiments, the reinforcement-learning model 260 is a neural network (e.g., a recurrent neural network) that implements any number of machine learning techniques to compute the optimization list 268.

In alternate embodiments, the reinforcement-learning model 260 implements any number and/or type of rules and/or algorithms in addition to or instead of machine learning techniques to generate the optimization list 268, and the techniques described herein are modified accordingly. For instance, in some embodiments, the reinforcement-learning model 260 implements a data-driven, rule-based approach to define a list of possible optimizations and then implements machine learning techniques to select one or more of the possible optimizations as the recommended optimizations that are included in the optimization list 268.

In alternate embodiments, the behavior-driven GUI subsystem 120 pre-trains the reinforcement-learning model 260 prior to executing the GUI personalization application 140(1). In some embodiments, the behavior-driven GUI subsystem 120 pre-trains the reinforcement-learning model 260 based on user interactions associated with any number of users 192 and a static version of the GUI 130 (e.g., the GUI 130(1)). In this fashion, the behavior-driven GUI subsystem 120 bootstraps the reinforcement-learning model 260 to an appropriate starting point before allowing the reinforcement-learning model 260 to make changes to the GUI 130 that can be detected by the user 192.

As shown, the GUI agent 270 modifies the GUI 130(1) based on the optimization list 268 and the GUI ontology 122 to generate the GUI 130(2). As depicted with a dashed arrow, in some embodiments, the GUI agent 270 may also modify the GUI ontology 122. For instance, in some embodiments, the GUI agent 270 may generate and add any number of new GUI element definitions 272, action definitions 274, and pathway definitions 276 in any combination to the GUI ontology 122. The GUI agent 270 may implement any number of the recommended optimizations included in the optimization list 268 in any technically feasible fashion.

In general, each of the recommended optimizations included in the optimization list 268 may be specified in any technically feasible fashion that is consistent with the capabilities of the reinforcement-learning model 260 and the GUI agent 270. In some embodiments, the GUI agent 270 processes and implements each recommended optimization based on the type of recommended optimization. For instance, in some embodiments, the reinforcement-learning model 260 may specify any number of recommended optimizations at the implementation level and/or any number of recommended optimizations at the behavioral level.

The GUI agent 270 implements each of the recommended optimizations that is specified at the implementation level without evaluating any other implementation options. Some examples of recommended optimizations that are specified at the implementation level include, without limitation, swapping the positions of the GUI elements 132(2) and 132(3), changing the background color of the GUI element 132(1), changing a parameter associated with the GUI element 132(2), etc.

By contrast, to implement a recommended optimization that is specified at the behavioral level, the GUI agent 270 evaluates the recommended optimization to select a specific implementation that achieves the recommended optimization. For example, to implement the exemplary recommended optimization of "consolidate the sequence of actions A, B, D, Z, and N associated with the GUI element 132(1)," the GUI agent 270 may evaluate any number of GUI element definitions 272, any number of action definitions 274, any number of existing pathway definitions 276, and/or any number of constraints 278 to determine a specific implementation. In particular, the GUI agent 270 could evaluate implementations that involve modifying the action(s) associated with any number of existing GUI elements 132 before selecting an implementation that involves generating a new GUI element 132 that executes the pathway "actions A, B, D, Z, and N" when activated.

The GUI agent 270 may implement any number of rules, algorithms, machine learning techniques, etc., in any technically feasible fashion to generate the GUI 130. For instance, in some embodiments, the GUI agent 270 is a neural network that is trained to write and modify GUI code (e.g., Hypertext Markup Language elements, Cascading Style Sheets, etc.) based on the GUI ontology 122 and the optimization list 268. In the same or other embodiments, the GUI agent 270 is a machine learning model that the behavior-driven GUI subsystem 120 trains before executing the GUI personalization application 140(1). The behavior-driven GUI subsystem 120 may train the GUI agent 270 based on any amount and/or type of training data associated with any number of users and any number and type of GUIs.

Figure 3:
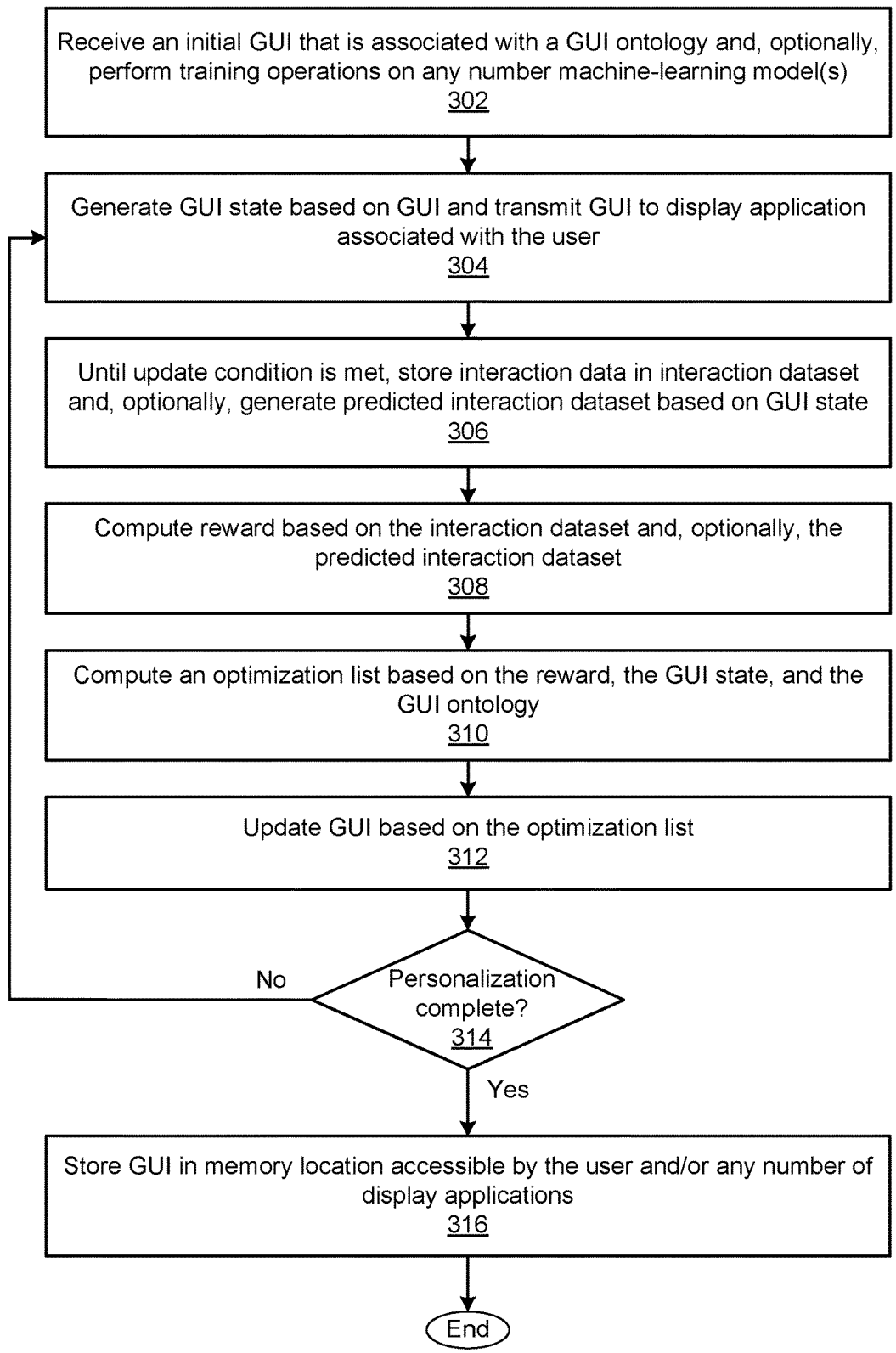
FIG. 3 is a flow diagram of method steps for generating graphical user interfaces for users, according to various embodiments.

FIG. 3 is a flow diagram of method steps for generating GUIs for users, according to various embodiments.

Although the method steps are described with reference to the systems of FIGS. 1-2, persons skilled in the art will understand that any system configured to implement the method steps, in any order, falls within the scope of the present invention.

As shown, a method 300 begins a step 302, where the behavior-driven GUI subsystem 120 receives an initial version of GUI 130 that is associated with the GUI ontology 122 and, optionally, performs training operations on any number of machine learning models. For instance, in some embodiments, the behavior-driven GUI subsystem 120 trains the interaction prediction model 230 and/or the GUI agent 270, and/or pre-trains the reinforcement-learning model 260.

At step 304, the GUI personalization application 140 generates the GUI state 210 based on the GUI 130 and the behavior-driven GUI subsystem 120 transmits the GUI 130 to the display application 190 associated with the user 192. At step 306, until the update condition 240 is met, the interaction tracking engine 220 stores the interaction data 198 associated with both the user 192 and the GUI 130 in the interaction dataset 222 and, optionally, the interaction prediction model 230 computes the predicted interaction dataset 232 based on the GUI state 210.

At step 308 (i.e., once the update condition 240 is met), the reward model 250 computes the reward 258 based on the interaction dataset 222 and, optionally, the predicted interaction dataset 232. At step 310, the reinforcement-learning model 260 computes the optimization list 268 based on the reward 258, the GUI state 210, and the GUI ontology 122. At step 312, the GUI agent 270 modifies the GUI 130 based on the optimization list 268. The modified GUI 130 is then displayed to the user 192 via the display application 190.

At step 314, the GUI personalization application 140 determines whether the personalization of the GUI 130 for the user 192 is complete. The GUI personalization application 140 may determine whether the personalization of the GUI 130 for the user 192 is complete in any technically feasible fashion. For instance, in some embodiments, the GUI personalization application 140 determines that the personalization of the GUI 130 for the user 192 is complete when the GUI personalization application 140 receives an exit command from the user 192.

If, at step 314, the GUI personalization application 140 determines that the personalization of the GUI 130 for the user 192 is not complete, then the method 300 returns to step 304, where the GUI personalization application 140 initiates a new optimization iteration based on the modified GUI 130.

If, however, at step 314, the GUI personalization application 140 determines that the personalization of the GUI 130 for the user 192 is complete, then the method 300 proceeds directly to step 316. At step 316, the GUI personalization application 140 stores the GUI 130 in a memory location that is accessible by the user 192 and/or any number of display applications 190. The method 300 then terminates.

In sum, the disclosed techniques enable automatic customization of GUIs for individual users. In some embodiments, a behavior-driven GUI subsystem includes, without limitation, a GUI ontology, any number of GUIs, and a GUI personalization application. The GUI ontology provides an abstract framework for graphically interacting with an associated application and includes, without limitation, GUI element definitions, action definitions, pathway definitions, constraints, and optimization definitions. Each GUI is a different manifestation of the GUI ontology and includes, without limitation, any number of GUI elements and an ontology mapping layer that maps the GUI to the GUI ontology. The GUI personalization application optimizes an existing GUI based on the interactions between a user and the existing GUI to generate a modified GUI that is optimized for the user. For each user, the behavior-driven GUI subsystem configures the GUI personalization application to iteratively optimize an initial GUI to continually improve the user experience for the user.

The GUI personalization application includes, without limitation, a GUI state, an interaction tracking engine, an update condition, a reward model, a reinforcement-learning model, and a GUI agent. Any number of the reward model, the reinforcement-learning model, and the GUI agent may operate based on labels associated with the GUI ontology. The GUI personalization application sets the GUI state equal to the existing GUI. As a user interacts with the existing GUI, the interaction tracking engine stores interaction data in an interaction dataset. Upon determining that the update condition is satisfied, the interaction tracking engine inputs the interaction dataset into a reward model. The reward model computes a reward based on the interaction dataset and any number of the optimization definitions included in the GUI ontology, where the reward correlates to the effectiveness of the GUI with respect to the user. The GUI personalization application then inputs the reward and the GUI state into a reinforcement-learning model that, in response, outputs an optimization list. The GUI agent modifies the existing GUI as per the optimization list and the user subsequently accesses the associated application via the modified GUI.

At least one technical advantage of the disclosed techniques relative to the prior art is that, with the disclosed techniques, a GUI for a given application can be personalized automatically for each user of the application. In particular, the GUI personalization application can consolidate multiple actions that a user often executes when interacting with the application into a single action to increase the effectiveness of the GUI for the user. Furthermore, because the GUI personalization application automatically optimizes the GUI based on interaction data, the GUI personalization application can be used to efficiently generate a wide range of GUIs, where each GUI is optimized for the individual preferences and the individual outcomes of a different user. Accordingly, with the disclosed techniques, the quality of the overall user experience when interacting with a particular application via a GUI is improved across a wider range of different users relative to prior art approaches that generate GUIs based on the aggregate preferences and the aggregate outcomes of segments of users. These technical advantages provide one or more technological improvements over prior art techniques.

1. In some embodiments, a computer-implemented method for generating a graphical user interface (GUI) for a software application comprises performing one or more tracking operations to determine a first plurality of interactions between a first user and a first GUI that is associated with the software application and a first GUI framework, computing a behavioral simplification for the first GUI based on the first plurality of interactions and the first GUI framework, and modifying the first GUI based on the behavioral simplification to generate a second GUI for the first user that is associated with the software application and the first GUI framework.

2. The computer-implemented method of clause 1, wherein computing the behavioral simplification comprises computing a reward based on the first plurality of interactions, and performing one or more reinforcement learning operations based on the first GUI and the reward to determine the behavioral simplification.

3. The computer-implemented method of clauses 1 or 2, wherein computing the behavioral simplification comprises performing one or more machine learning operations to determine a reward function based on at least one of the first user, the first GUI, or the first plurality of interactions, computing a reward based on the reward function and the first plurality of interactions, and performing one or more reinforcement learning operations based on the first GUI and the reward to determine the behavioral simplification.

4. The computer-implemented method of any of clauses 1-3, wherein computing the behavioral simplification comprises selecting a first rule from a plurality of rules based on at least one of the first GUI, the first plurality of interactions, or the first user, and applying the first rule to the first GUI to determine the behavioral simplification.

5. The computer-implemented method of any of clauses 1-4, wherein the first GUI includes a first GUI element that executes a first action when activated, and modifying the first GUI comprises modifying the first GUI element to execute one or more actions resulting from at least a portion of the first plurality of interactions, instead of the first action, when activated.

6. The computer-implemented method of any of clauses 1-5, wherein modifying the first GUI comprises adding a first GUI element to the first GUI, wherein the first GUI element executes one or actions resulting from at least a portion of the first plurality of interactions when activated.

7. The computer-implemented method of any of clauses 1-6, further comprising performing one or more tracking operations to determine a second plurality of interactions between the first user and the second GUI, computing a non-behavioral preference for the second GUI based on the second plurality of interactions and the first GUI framework, and modifying the second GUI based on the non-behavioral preference to generate a third GUI for the first user that is associated with the software application and the first GUI framework.

8. The computer-implemented method of any of clauses 1-7, wherein modifying the second GUI comprises changing at least one of a color, a size, a shape, or a position associated with a first GUI element included in the first GUI.

9. The computer-implemented method of any of clauses 1-8, wherein the software application comprises a web-based service.

10. The computer-implemented method of any of clauses 1-9, wherein the first GUI framework describes a plurality of GUI elements that includes at least one of a viewable page, a segment that includes a plurality of viewable pages, a pane, a dropdown list, a text field, or a slider.

11. In some embodiments, one or more non-transitory computer readable media include instructions that, when executed by one or more processors, cause the one or more processors to generate a graphical user interface (GUI) for a software application by performing the steps of performing one or more tracking operations to determine a first plurality of interactions between a first user and a first GUI that is associated with the software application and a first GUI framework, computing a behavioral simplification for the first GUI based on the first plurality of interactions and the first GUI framework, and modifying the first GUI based on the behavioral simplification to generate a second GUI for the first user that is associated with the software application and the first GUI framework.

12. The one or more non-transitory computer readable media of clause 11, wherein computing the behavioral simplification comprises computing a reward based on the first plurality of interactions, and inputting the reward and a first state associated with the first GUI into a Deep Q Network to generate the behavioral simplification.

13. The one or more non-transitory computer readable media of clauses 11 or 12, wherein computing the behavioral simplification comprises performing one or more machine learning operations to determine a reward function based on at least one of the first user, the first GUI, or the first plurality of interactions, computing a reward based on the reward function and the first plurality of interactions, and performing one or more reinforcement learning operations based on the first GUI and the reward to determine the behavioral simplification.

14. The one or more non-transitory computer readable media of any of clauses 11-13, wherein modifying the first GUI comprises inputting the behavioral simplification and the first GUI into a neural network that has been trained to write GUI code in order to generate the second GUI.

15. The one or more non-transitory computer readable media of any of clauses 11-14, wherein the first GUI includes a first GUI element that executes a first action when activated, and modifying the first GUI comprises modifying the first GUI element to execute one or more actions resulting from at least a portion of the first plurality of interactions, instead of the first action, when activated.

16. The one or more non-transitory computer readable media of any of clauses 11-15, wherein modifying the first GUI comprises adding a first GUI element to the first GUI, wherein the first GUI element executes one or actions resulting from at least a portion of the first plurality of interactions when activated.

17. The one or more non-transitory computer readable media of any of clauses 11-16, further comprising performing one or more tracking operations to determine a second plurality of interactions between the first user and the second GUI, computing a non-behavioral preference for the second GUI based on the second plurality of interactions and the first GUI framework, and modifying the second GUI based on the non-behavioral preference to generate a third GUI for the first user that is associated with the software application and the first GUI framework.

18. The one or more non-transitory computer readable media of any of clauses 11-17, wherein modifying the second GUI comprises reordering positions of at least two GUI elements included in the first GUI.

19. The one or more non-transitory computer readable media of any of clauses 11-18, wherein the software application comprises a web-based service.

20. In some embodiments, a system comprises one or more memories storing instructions and one or more processors coupled to the one or more memories that, when executing the instructions, perform the steps of performing one or more tracking operations to determine a first plurality of interactions between a first user and a first GUI that is associated with a software application and a GUI framework, computing a behavioral simplification for the first GUI based on the first plurality of interactions and the GUI framework, and modifying the first GUI based on the behavioral simplification to generate a second GUI for the first user that is associated with the software application and the GUI framework.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a graphical user interface (GUI) for a software application, the computer-implemented method comprising:
    performing one or more tracking operations to determine a first plurality of interactions between a first user and a first GUI that is associated with the software application and a first GUI framework;
    computing a behavioral simplification for the first GUI based on the first plurality of interactions and the first GUI framework; and
    modifying the first GUI based on the behavioral simplification for the first GUI to generate a second GUI for the first user that is associated with the software application and the first GUI framework, wherein modifying the first GUI comprises adding a first GUI element to the first GUI, and wherein, when the first GUI element is activated, the first GUI element executes a first plurality of actions resulting from a consolidation of the first plurality of interactions.

2. The computer-implemented method of claim 1, wherein computing the behavioral simplification for the first GUI comprises:
    computing a reward based on the first plurality of interactions; and
    performing one or more reinforcement learning operations based on the first GUI and the reward to determine the behavioral simplification for the first GUI.

3. The computer-implemented method of claim 1, wherein computing the behavioral simplification for the first GUI comprises:
    performing one or more machine learning operations to determine a reward function based on at least one of the first user, the first GUI, or the first plurality of interactions;
    computing a reward based on the reward function and the first plurality of interactions; and
    performing one or more reinforcement learning operations based on the first GUI and the reward to determine the behavioral simplification for the first GUI.

4. The computer-implemented method of claim 1, wherein computing the behavioral simplification for the first GUI comprises:
    selecting a first rule from a plurality of rules based on at least one of the first GUI, the first plurality of interactions, or the first user; and applying the first rule from the plurality of rules to the first GUI to determine the behavioral simplification for the first GUI.

5. The computer-implemented method of claim 1, wherein the first GUI includes a second GUI element that executes a first action when activated, and modifying the first GUI comprises modifying the second GUI element to execute one or more actions resulting from at least a portion of the first plurality of interactions, instead of the first action, when activated.

6. The computer-implemented method of claim 1, further comprising:
performing one or more tracking operations to determine a second plurality of interactions between the first user and the second GUI;
computing a non-behavioral preference for the second GUI based on the second plurality of interactions and the first GUI framework; and
modifying the second GUI based on the non-behavioral preference to generate a third GUI for the first user that is associated with the software application and the first GUI framework.

7. The computer-implemented method of claim 6, wherein modifying the second GUI comprises changing at least one of a color, a size, a shape, or a position associated with the first GUI element included in the first GUI.

8. The computer-implemented method of claim 1, wherein the software application comprises a web-based service.

9. The computer-implemented method of claim 1, wherein the first GUI framework describes a plurality of GUI elements that includes at least one of a viewable page, a segment that includes a plurality of viewable pages, a pane, a dropdown list, a text field, or a slider.

10. The computer-implemented method of claim 1, wherein the behavioral simplification for the first GUI indicates the consolidation of the first plurality of interactions into a single interaction.

11. One or more non-transitory computer readable media storing instructions that, when executed by one or more processors, cause the one or more processors to generate a graphical user interface (GUI) for a software application by performing the steps of:
performing one or more tracking operations to determine a first plurality of interactions between a first user and a first GUI that is associated with the software application and a first GUI framework;
computing a behavioral simplification for the first GUI based on the first plurality of interactions and the first GUI framework; and
modifying the first GUI based on the behavioral simplification for the first GUI to generate a second GUI for the first user that is associated with the software application and the first GUI framework, wherein modifying the first GUI comprises adding a first GUI element to the first GUI, and wherein, when the first GUI element is activated, the first GUI element executes a first plurality of actions resulting from a consolidation of the first plurality of interactions.

12. The one or more non-transitory computer readable media of claim 11, wherein computing the behavioral simplification for the first GUI comprises:
computing a reward based on the first plurality of interactions; and
inputting the reward and a first state associated with the first GUI into a Deep Q Network to generate the behavioral simplification for the first GUI.

13. The one or more non-transitory computer readable media of claim 11, wherein computing the behavioral simplification for the first GUI comprises:
performing one or more machine learning operations to determine a reward function based on at least one of the first user, the first GUI, or the first plurality of interactions;
computing a reward based on the reward function and the first plurality of interactions; and
performing one or more reinforcement learning operations based on the first GUI and the reward to determine the behavioral simplification for the first GUI.

14. The one or more non-transitory computer readable media of claim 11, wherein modifying the first GUI comprises inputting the behavioral simplification for the first GUI and the first GUI into a neural network that has been trained to write GUI code in order to generate the second GUI.

15. The one or more non-transitory computer readable media of claim 11, wherein the first GUI includes a second GUI element that executes a first action when activated, and modifying the first GUI comprises modifying the second GUI element to execute one or more actions resulting from at least a portion of the first plurality of interactions, instead of the first action, when activated.

16. The one or more non-transitory computer readable media of claim 11, further comprising:
performing one or more tracking operations to determine a second plurality of interactions between the first user and the second GUI;
computing a non-behavioral preference for the second GUI based on the second plurality of interactions and the first GUI framework; and
modifying the second GUI based on the non-behavioral preference to generate a third GUI for the first user that is associated with the software application and the first GUI framework.

17. The one or more non-transitory computer readable media of claim 16, wherein modifying the second GUI comprises reordering positions of at least two GUI elements included in the first GUI.

18. The one or more non-transitory computer readable media of claim 11, wherein the software application comprises a web-based service.

19. A system comprising:
one or more memories storing instructions; and
one or more processors coupled to the one or more memories that, when executing the instructions, perform the steps of:
performing one or more tracking operations to determine a first plurality of interactions between a first user and a first GUI that is associated with the software application and a first GUI framework;
computing a behavioral simplification for the first GUI based on the first plurality of interactions and the first GUI framework; and
modifying the first GUI based on the behavioral simplification for the first GUI to generate a second GUI for the first user that is associated with the software application and the first GUI framework, wherein modifying the first GUI comprises adding a first GUI element to the first GUI, and wherein, when the first GUI element is activated, the first GUI element executes a first plurality of actions resulting from a consolidation of the first plurality of interactions.

20. A computer-implemented method for generating a graphical user interface (GUI) for a software application, the computer-implemented method comprising:
- performing one or more tracking operations to determine a first plurality of interactions between a first user and a first GUI that is associated with the software application and a first GUI framework;
- computing a behavioral simplification for the first GUI based on the first plurality of interactions and the first GUI framework, wherein computing the behavioral simplification for the first GUI comprises:
  - computing a reward based on the first plurality of interactions; and
  - performing one or more reinforcement learning operations based on the first GUI and the reward to determine the behavioral simplification for the first GUI; and
- modifying the first GUI based on the behavioral simplification for the first GUI to generate a second GUI for the first user that is associated with the software application and the first GUI framework.

* * * * *